(12) United States Patent
Chen

(10) Patent No.: US 10,148,176 B2
(45) Date of Patent: Dec. 4, 2018

(54) DC TO DC CONVERTER WITH PULSE WIDTH MODULATION AND A CLAMPING CIRCUIT FOR NON-PULSE WIDTH MODULATION CONTROL

(71) Applicant: Novatek Microelectronics Corp., Hsinchu (TW)

(72) Inventor: Wei-Ling Chen, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 15/391,862

(22) Filed: Dec. 28, 2016

(65) Prior Publication Data

US 2018/0183331 A1    Jun. 28, 2018

(51) Int. Cl.
*H02M 3/158* (2006.01)
*H02M 3/156* (2006.01)
*H02M 1/00* (2006.01)
*H02M 1/08* (2006.01)

(52) U.S. Cl.
CPC ............. *H02M 3/158* (2013.01); *H02M 1/08* (2013.01); *H02M 3/156* (2013.01); *H02M 2001/009* (2013.01); *H02M 2001/0032* (2013.01)

(58) Field of Classification Search
CPC ................... H02M 3/158; H02M 1/08; H02M 2001/0009; H02M 3/156
See application file for complete search history.

(56) References Cited

U.S. PATENT DOCUMENTS

| | | | | |
|---|---|---|---|---|
| 6,369,557 B1* | 4/2002 | Agiman | ................ | H02M 3/156 323/282 |
| 2006/0043953 A1* | 3/2006 | Xu | ......................... | H02M 3/156 323/282 |
| 2009/0315523 A1* | 12/2009 | Kumagai | .............. | H02M 3/156 323/272 |
| 2012/0098512 A1* | 4/2012 | Kirchner | ............... | H02M 3/156 323/284 |
| 2013/0141069 A1* | 6/2013 | Li | ........................ | H02M 3/158 323/283 |

* cited by examiner

*Primary Examiner* — Jue Zhang
*Assistant Examiner* — Jye-June Lee
(74) *Attorney, Agent, or Firm* — JCIPRNET

(57) ABSTRACT

A DC-to-DC converter and a PWM device thereof are provided. The PWM device includes a ramp generator circuit, an error amplifier, a comparator and a clamping circuit. The error amplifier compares a voltage difference between the feedback voltage and the reference voltage to output a comparison voltage corresponding to the voltage difference. The comparator compares a ramp voltage of the ramp generator circuit and the comparison voltage of the error amplifier, so as to output a pulse signal. The clamping circuit determines whether to induce the comparison voltage to follow the ramp voltage. The clamping circuit is disabled when the PWM device is operated in the PWM mode, such that the comparison voltage and the ramp voltage are independent of each other. The clamping circuit is enabled when the PWM device is operated in the non-PWM mode, such that the comparison voltage follows the ramp voltage.

9 Claims, 4 Drawing Sheets

DC TO DC CONVERTER WITH PULSE WIDTH MODULATION AND A CLAMPING CIRCUIT FOR NON-PULSE WIDTH MODULATION CONTROL

BACKGROUND

Field of the Invention

The invention is directed to an electronic circuit and more particularly, to a DC-to-DC converter and a pulse width modulation (PWM) device thereof.

Description of Related Art

Among electronic products at present, a power management circuit always plays an important role. For instance, a DC-to-DC converter is a commonly used and important power management technique. A conventional DC-to-DC converter can dynamically adjust an output current according to a load status by using a pulse-width modulation (PWM) mode. The conventional DC-to-DC converter may perform voltage regulation by means of PWM for heavy-load power supply (which requires more output current), and perform the voltage regulation by means of pulse frequency modulation (PFM) for light-load power supply (which requires less output current). The conventional DC-to-DC converter can be dynamically switched to the PWM mode or the PFM mode according to the size of a load current. In any case, a speed for switching the conventional DC-to-DC converter from the PFM mode back to the PWM mode is usually not preferable.

SUMMARY

The invention provides a DC-to-DC converter and a pulse width modulation (PWM) device thereof, capable of being rapidly and instantly switched from a non-PWM mode back to a PWM mode.

According to an embodiment of the invention, a PWM device for receiving a feedback voltage and correspondingly outputting a pulse signal is provided. The PWM device includes a ramp generator circuit, an error amplifier, a comparator and a clamping circuit. The ramp generator circuit is configured to generate a ramp voltage. The error amplifier receives the feedback voltage and a first reference voltage, compares a voltage difference between the feedback voltage and the first reference voltage and outputs a comparison voltage corresponding to the voltage difference. A first input terminal and a second input terminal of the comparator are respectively coupled to an output terminal of the ramp generator circuit and an output terminal of the error amplifier. The comparator is configured to receive and compare the ramp voltage and the comparison voltage, so as to output the pulse signal. A first terminal and a second terminal of the clamping circuit are respectively coupled to the output terminal of the ramp generator circuit and the output terminal of the error amplifier. The clamping circuit is configured to determine whether to induce the comparison voltage to follow the ramp voltage. The clamping circuit is disabled to induce the comparison voltage to be independent from the ramp voltage when the PWM device is operated in a PWM mode. The clamping circuit is enabled to induce the comparison voltage to follow the ramp voltage when the PWM device is operated in a non-PWM mode.

According to an embodiment of the invention, a DC-to-DC converter for converting an input voltage into an output voltage is provided. The DC-to-DC converter includes a DC-to-DC converter circuit, a PWM device and a control circuit. The DC-to-DC converter circuit is configured to covert the input voltage into the output voltage based on control of a PWM signal. An input terminal of the PWM device is coupled to the DC-to-DC converter circuit to receive a feedback voltage. The PWM device is configured to output a pulse signal corresponding to the feedback voltage to a control circuit. The PWM device includes a ramp generator circuit, an error amplifier, a comparator and a clamping circuit. The ramp generator circuit is configured to generate a ramp voltage. The error amplifier receives the feedback voltage and a first reference voltage and compares a voltage difference between the feedback voltage and the first reference voltage. The error amplifier outputs a comparison voltage corresponding to the voltage difference. A first input terminal and a second input terminal of the comparator are respectively coupled to an output terminal of the ramp generator circuit and an output terminal of the error amplifier. The comparator compares the ramp voltage and the comparison voltage, so as to output the pulse signal. A first terminal and a second terminal of the clamping circuit are respectively coupled to the output terminal of the ramp generator circuit and the output terminal of the error amplifier. The clamping circuit determines whether to induce the comparison voltage to follow the ramp voltage. The clamping circuit is disabled to induce the comparison voltage to be independent from the ramp voltage when the PWM device is operated in a PWM mode. The clamping circuit is enabled to induce the comparison voltage to follow the ramp voltage when the PWM device is operated in a non-PWM mode. The control circuit is coupled to an output terminal of the comparator to receive the pulse signal. The control circuit and coupled to the DC-to-DC converter circuit to provide the PWM signal.

To sum up, in the DC-to-DC converter and the PWM device thereof provided by the embodiments of the invention, the clamping circuit is configured. The error amplifier receives the feedback voltage and the first reference voltage, compares the voltage difference therebetween and outputs the comparison voltage corresponding to the voltage difference. The clamping circuit is disabled to induce the comparison voltage to be independent from the ramp voltage when the PWM device is operated in a PWM mode. Thus, the clamping circuit does not influence the operation in the PWM mode. The clamping circuit is enabled to induce the comparison voltage to follow the ramp voltage when the PWM device is operated in a non-PWM mode. Thus, when a load becomes heavy, an operation of the DC-to-DC converter can be rapidly and instantly switched from the non-PWM mode back to the PWM mode.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
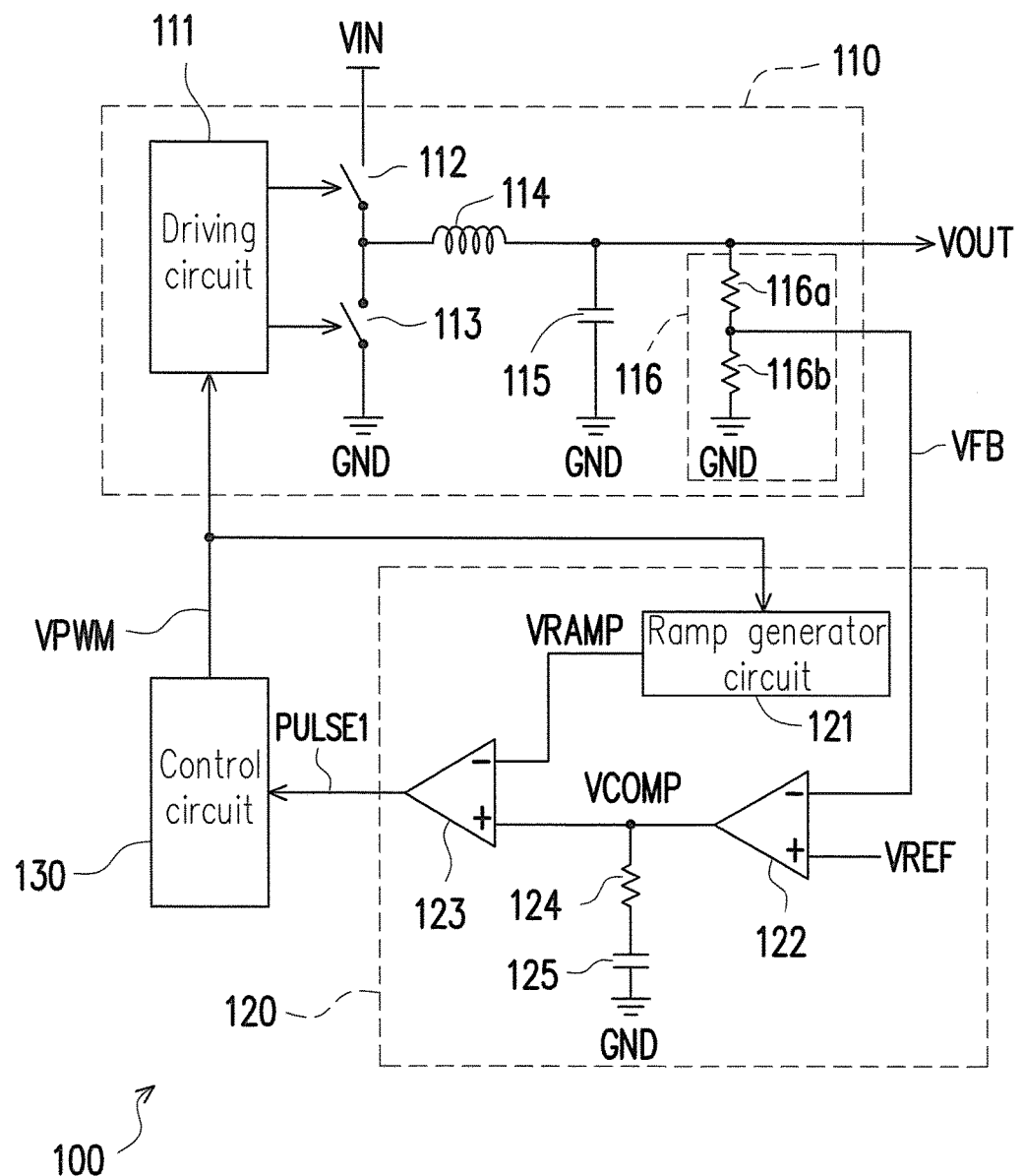
FIG. 1 is a schematic circuit block diagram illustrating a DC-to-DC converter according to an embodiment of the invention.

A term "couple" used in the full text of the disclosure (including the claims) refers to any direct and indirect connections. For instance, if a first device is described to be coupled to a second device, it is interpreted as that the first device is directly coupled to the second device, or the first device is indirectly coupled to the second device through other devices or connection means. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a schematic circuit block diagram illustrating a DC-to-DC converter 100 according to an embodiment of the invention. The DC-to-DC converter 100 illustrated in FIG. 1 converts an input voltage VIN into a rated output voltage VOUT. The DC-to-DC converter 100 includes a DC-to-DC converter circuit 110, a pulse width modulation (PWM) device 120 and a control circuit 130. The DC-to-DC converter circuit 110 converts the input voltage VIN into the output voltage VOUT based on control of a PWM signal VPWM. According to design requirements, in different embodiments, the DC-to-DC converter circuit 110 may be a converter circuit of different types. For instance, the DC-to-DC converter circuit 110 illustrated in FIG. 1 may be a buck converter circuit. In other embodiments, the DC-to-DC converter circuit 110 may be a boost converter circuit or other types of converter circuits.

In the embodiment illustrated in FIG. 1, the DC-to-DC converter circuit 110 includes a driving circuit 111, a first power switch 112, a second power switch 113, an inductor 114, a capacitor 115 and a feedback circuit 116. The driving circuit 111 is coupled to a control terminal of the first power switch 112 and a control terminal of the second power switch 113. The driving circuit 111 controls the first power switch 112 and the second power switch 113 based on the PWM signal VPWM of the control circuit 130. A first terminal of the first power switch 112 is coupled to the input voltage VIN. A first terminal of the second power switch 113 is coupled to a second terminal of the first power switch 112. A second terminal of the second power switch 113 is coupled to a reference voltage (e.g., a ground voltage GND or any other fixed voltage). A first terminal of the inductor 114 is coupled to the second terminal of the first power switch 112 and the first terminal of the second power switch 113. A second terminal of the inductor 114 provides the output voltage VOUT. A first terminal of the capacitor 115 is coupled to the second terminal of the inductor 114. A second terminal of the capacitor 115 is coupled to a reference voltage (e.g., a ground voltage GND or any other fixed voltage).

A first terminal of the feedback circuit 116 is coupled to the second terminal of the inductor 114. A second terminal of the feedback circuit 116 provides a feedback voltage VFB to the PWM device 120. The feedback circuit 116 illustrated in FIG. 1 includes two resistors 116a and 116b which are connected in series. A first terminal of the resistor 116a is coupled to the second terminal of the inductor 114. A first terminal of the resistor 116b is coupled to a second terminal of the resistor 116a. A second terminal of the resistor 116b is coupled to a reference voltage (e.g., a ground voltage GND or any other fixed voltage). The second terminal of the resistor 116a provides the feedback voltage VFB to the second terminal of the feedback circuit 116. In any case, the feedback circuit 116 should not be limited to the embodiment illustrated in FIG. 1. According to design requirements, the feedback circuit 116 may also be implemented in other manners. For instance, in another embodiment, the feedback circuit 116 may employs the output voltage VOUT as the feedback voltage VFB and provides it to the PWM device 120.

An input terminal of the PWM device 120 is coupled to the DC-to-DC converter circuit 110 to receive the feedback voltage VFB. The PWM device 120 outputs a pulse signal PULSE1 corresponding to the feedback voltage VFB to the control circuit 130. In the embodiment illustrated in FIG. 1, the PWM device 120 includes a ramp generator circuit 121, an error amplifier 122 and a comparator 123. The ramp generator circuit 121 is configured to generate a ramp voltage VRAMP. The implementation of the ramp generator circuit 121 is not limited in the present embodiment. For instance, the ramp generator circuit 121 may be a conventional ramp generator, a conventional triangle wave generator, a conventional sawtooth wave generator or another clock generator circuit.

A first input terminal (e.g., an inverting input terminal) of the error amplifier 122 is coupled to DC-to-DC converter circuit 110 to receive the feedback voltage VFB. A second input terminal (e.g., a non-inverting input terminal) of the error amplifier 122 is coupled to a reference voltage VREF. The error amplifier 122 compares a voltage difference VREF-VFB between the feedback voltage VFB and the reference voltage VREF. The error amplifier 122 outputs a comparison voltage VCOMP corresponding to the voltage difference VREF-VFB to the comparator 123. According to design requirements, the PWM device 120 may also be selectively equipped with a resistor 124 and a capacitor 125. A first terminal of the resistor 124 is coupled to an output terminal of the error amplifier 122 to receive the comparison voltage VCOMP. A first terminal of the capacitor 125 is coupled to a second terminal of the resistor 124. A second terminal of the capacitor 125 is coupled to a reference voltage (e.g., a ground voltage GND or any other fixed voltage).

Figure 2:
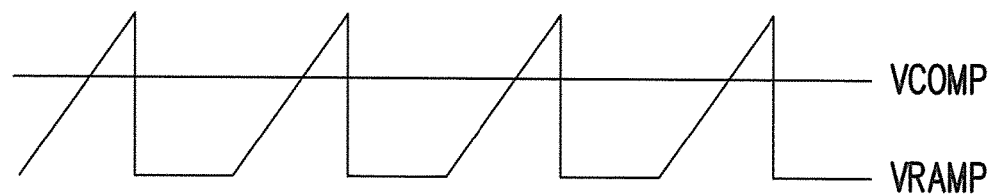
FIG. 2 is a schematic waveform diagram of the ramp voltage and the comparison voltage depicted in FIG. 1 in a pulse width modulation (PWM) mode according to an embodiment of the invention.

FIG. 2 is a schematic waveform diagram of the ramp voltage VRAMP and the comparison voltage VCOMP depicted in FIG. 1 in a PWM mode according to an embodiment of the invention. In FIG. 2, the horizontal axis represents time, and the vertical axis represents voltage. Referring to FIG. 1 and FIG. 2, a first input terminal (e.g., an inverting input terminal) of the comparator 123 is coupled to and output terminal of the ramp generator circuit 121 to receive the ramp voltage VRAMP. A second input terminal (e.g., a non-inverting input terminal) of the comparator 123 is coupled to the output terminal of the error amplifier 122 to receive the comparison voltage VCOMP. A level of the comparison voltage VCOMP is proportional to a load current (or a current of the inductor 114). The comparator 123 compares the ramp voltage VRAMP and the comparison voltage VCOMP and outputs the pulse signal PULSE1 to the control circuit 130 based on the comparison result. When the level of the comparison voltage VCOMP is higher than a level of the ramp voltage VRAMP, the comparator 123 outputs a logic-high voltage. When the level of the comparison voltage VCOMP is lower than the level of the ramp voltage VRAMP, the comparator 123 outputs a logic-low voltage. When the PWM mode is entered, the level of the comparison voltage VCOMP is greater than a lowest level of the ramp voltage VRAMP.

The control circuit 130 is coupled to an output terminal of the comparator 123 to receive the pulse signal PULSE1. The control circuit 130 is further coupled to the DC-to-DC converter circuit 110 to provide the PWM signal VPWM. The control circuit 130 is configured to detect the current of the inductor 114. The control circuit 130 performs a conventional zero current detection (ZCD) operation according to the current of the inductor 114. According to a ZCD result, the control circuit 130 obtains a load status. The control circuit 130 is dynamically switched to a PWM mode or a non-PWM mode (e.g., a PFM mode) according to the load status. For a heavy-load status (i.e., more output current is required), the control circuit 130 is operated in the PWM mode. Details related to the operation in the PWM mode pertains to a conventional technique and thus, will not be repeatedly described. If the load status is changed from the heavy load to a light load (i.e., less output current is required), the control circuit 130 is switched from the PWM mode to the non-PWM mode (e.g., the PFM mode). Details related to the operation in the PFM mode pertains to a conventional technique and thus, will not be repeatedly described.

Figure 3:
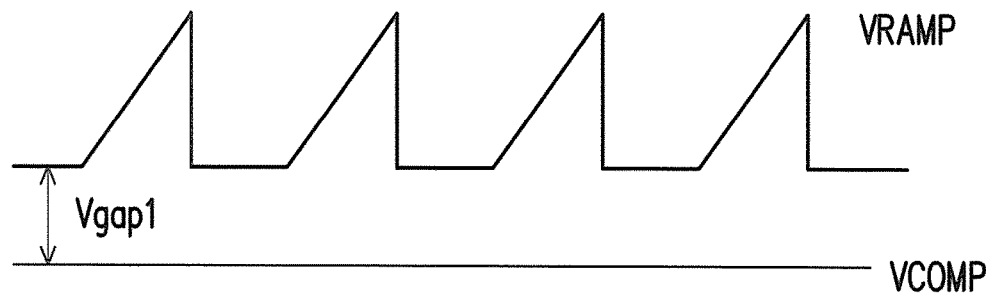
FIG. 3 is a schematic waveform diagram of the ramp voltage and the comparison voltage depicted in FIG. 1 in the pulse frequency modulation (PFM) mode according to an embodiment of the invention.

FIG. 3 is a schematic waveform diagram of the ramp voltage VRAMP and the comparison voltage VCOMP depicted in FIG. 1 in the PFM mode according to an embodiment of the invention. In FIG. 3, the horizontal axis represents time, and the vertical axis represents voltage. In the PFM mode, the comparison voltage VCOMP is independent from the ramp voltage VRAMP. In a light-load status, a level of the feedback voltage VFB is often higher than a level of the reference voltage VREF, such that the comparison voltage VCOMP is dropped down. Thus, when the PFM mode is entered, the level of the comparison voltage VCOMP is often lower than the lowest level of the ramp voltage VRAMP. A significant voltage gap Vgap1 often occurs between the ramp voltage VRAMP and the dropped comparison voltage VCOMP, as illustrated in FIG. 3.

If the load status is changed from the light load to the heavy load, the control circuit 130 returns to the PWM mode from the non-PWM mode (e.g., the PFM mode). However, during the process of the switching from the PFM mode to the PWM mode, the comparison voltage VCOMP illustrated in FIG. 3 is pulled up to be within a swing range of the ramp voltage VRAMP. The PWM mode may be normally operated only when the comparison voltage VCOMP is pulled up to be within the swing range of the ramp voltage VRAMP. Apparently, the greater the voltage gap Vgap1 illustrated in FIG. 3, the more unfavorable for the instant rise of the comparison voltage VCOMP. Namely, as the voltage gap Vgap1 increases, the time required for the return to the PWM mode from the PFM mode increases.

Figure 4:
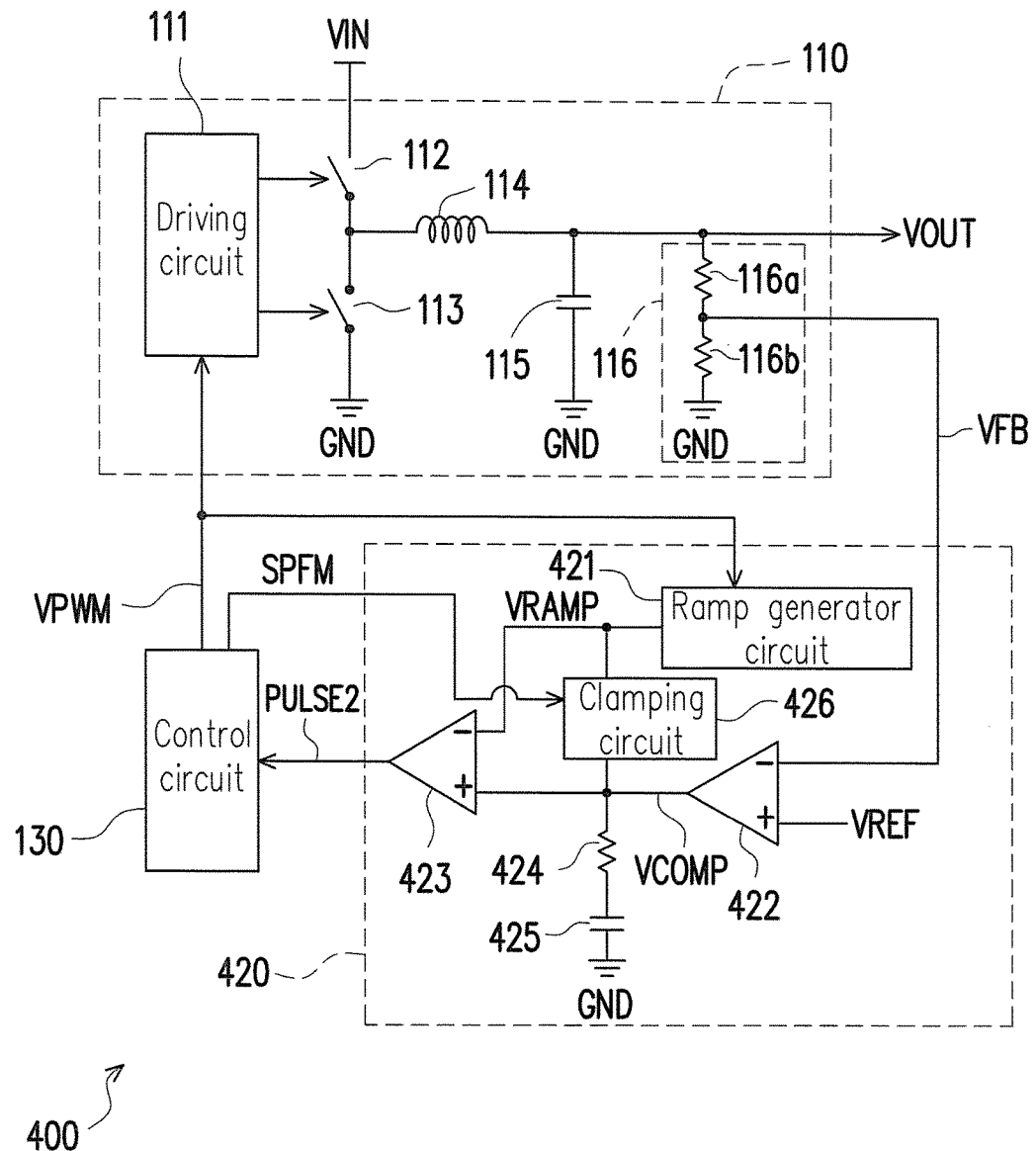
FIG. 4 is a schematic circuit block diagram illustrating a DC-to-DC converter according to another embodiment of the invention.

FIG. 4 is a schematic circuit block diagram illustrating a DC-to-DC converter 400 according to another embodiment of the invention. The DC-to-DC converter 400 illustrated in FIG. 4 includes a DC-to-DC converter circuit 110, a PWM device 420 and a control circuit 130. The PWM device 420 illustrated in FIG. 4 includes a ramp generator circuit 421, an error amplifier 422, a comparator 423 and a clamping circuit 426. According to design requirements, the PWM device 420 may also be selectively equipped with a resistor 424 and a capacitor 425. The DC-to-DC converter 400, the DC-to-DC converter circuit 110, the PWM device 420, the ramp generator circuit 421, the error amplifier 422, the comparator 423, the resistor 424, the capacitor 425 and the control circuit 130 illustrated in FIG. 4 may be inferred with reference to the descriptions related to the DC-to-DC converter 100, the DC-to-DC converter circuit 110, the PWM device 120, the ramp generator circuit 121, the error amplifier 122, the comparator 123, the resistor 124, the capacitor 125 and the control circuit 130 illustrated in FIG. 1 and thus, will not be repeated.

Referring to FIG. 4, a first terminal of the clamping circuit 426 is coupled to an output terminal of the ramp generator circuit 421 to receive the ramp voltage VRAMP. A second terminal of the clamping circuit 426 is coupled to an output terminal of the error amplifier 422 to receive the comparison voltage VCOMP. The control circuit 130 may be dynamically switched to the PWM mode or the non-PWM mode (e.g., the PFM mode) based on the load status. The control circuit 130 controls the clamping circuit 426 according to a modulation mode (e.g. the PWM mode, the PFM mode or other modes). The clamping circuit 426 is configured to determine whether to induce the comparison voltage VCOMP to follow the ramp voltage VRAMP based on the control of the control circuit 130. For instance, the control circuit 130 outputs a mode switching signal SPFM to the clamping circuit 426 of the PWM device 420. When the PWM device 420 is operated in the PWM mode, the mode switching signal SPFM disables the clamping circuit 426. When the clamping circuit 426 is disabled, the first terminal of the clamping circuit 426 is disconnected from the second terminal. Thus, when the PWM device 420 is operated in the PWM mode, the comparison voltage VCOMP is independent from the ramp voltage VRAMP. Waveforms of the comparison voltage VCOMP and the ramp voltage VRAMP in the PWM mode may refer to FIG. 2.

Figure 5:
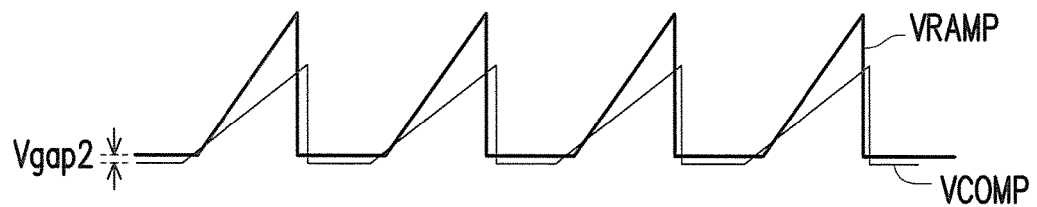
FIG. 5 is a schematic waveform diagram of the ramp voltage and the comparison voltage depicted in FIG. 4 in the PFM mode according to an embodiment of the invention.

FIG. 5 is a schematic waveform diagram of the ramp voltage VRAMP and the comparison voltage VCOMP depicted in FIG. 4 in the PFM mode according to an embodiment of the invention. In FIG. 5, the horizontal axis represents time, and the vertical axis represents voltage. When the PWM device 420 is operated in the PFM mode (i.e., the non-PWM mode), the mode switching signal SPFM enables the clamping circuit 426. When the clamping circuit 426 is enabled, the clamping circuit 426 induces the comparison voltage VCOMP to follow the ramp voltage VRAMP. Based on the setting of the clamping circuit 426, a voltage gap Vgap2 (which is a voltage gap between the ramp voltage VRAMP and the comparison voltage VCOMP) illustrated in FIG. 5 is reduced as much as possible, which is conducive to the instant return to the PWM mode.

In case the load needs energy (i.e., VFB<VREF), the comparison voltage VCOMP has to be instantly higher than the ramp voltage VRAMP, so as to output a pulse signal PULSE2. In other words, in case the load needs the energy in a great level, the PWM device 420 has to be instantly switched back to the PWM mode from the PFM mode.

Apparently, when the PWM device 420 returns to the PWM mode from the PFM mode, the smaller the voltage gap Vgap2 illustrated in FIG. 5, the more favorable for the instant rise of the comparison voltage VCOMP. Namely, because the voltage gap Vgap2 is sufficiently small, the time required for the return to the PWM mode from the PFM mode may be accelerated.

Figure 6:
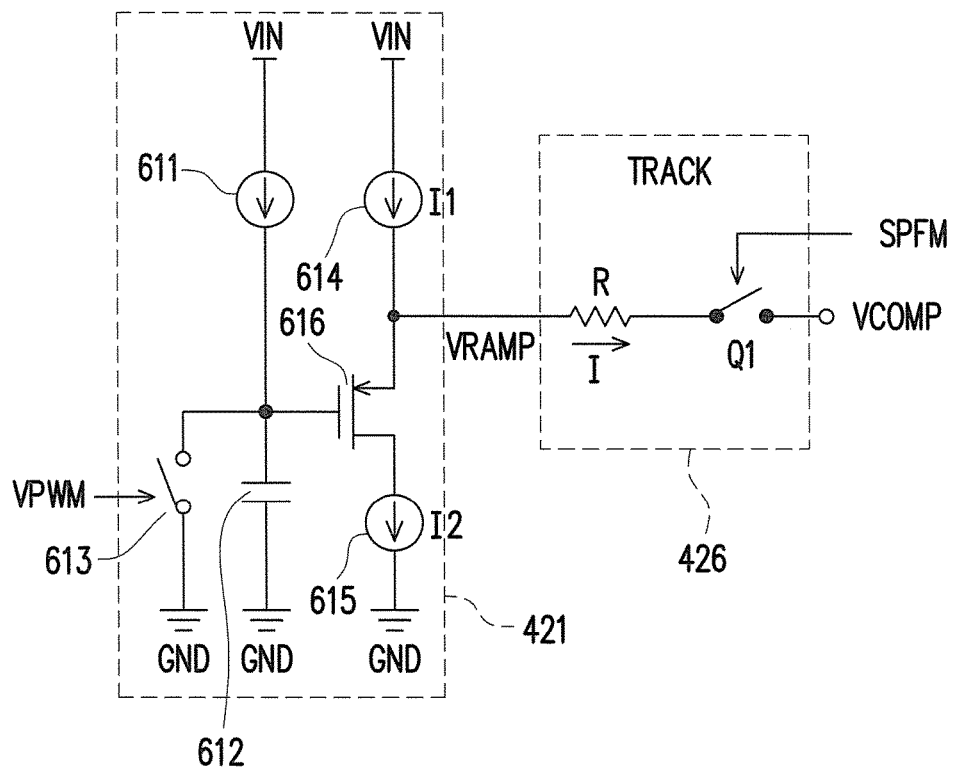
FIG. 6 is a schematic circuit diagram illustrating of the ramp generator circuit and the clamping circuit depicted in FIG. 4 according to an embodiment of the invention.

FIG. 6 is a schematic circuit diagram illustrating of the ramp generator circuit 421 and the clamping circuit 426 depicted in FIG. 4 according to an embodiment of the invention. The ramp generator circuit 421 illustrated in FIG. 6 includes a first current source 611, a capacitor 612, a switch 613, a second current source 614, a third current source 615 and a transistor 616. A first terminal of the capacitor 612 is coupled to a current output terminal of the first current source 611. A second terminal of the capacitor 612 is coupled to a reference voltage (e.g., a ground voltage GND or any other fixed voltage). A first terminal of the switch 613 is coupled to the first terminal of the capacitor 612. A second terminal of the switch 613 is coupled to a reference voltage (e.g., a ground voltage GND or any other fixed voltage). A control terminal of the switch 613 is controlled by the PWM signal VPWM of the control circuit 130. A current output terminal of the second current source 614 is coupled to the output terminal of the ramp generator circuit 421. The output terminal of the ramp generator circuit 421 provides the ramp voltage VRAMP. A first terminal (e.g., a source) of the transistor 616 is coupled to the current output terminal of the second current source 614. A second terminal (e.g., drain) of the transistor 616 is coupled to a current input terminal of the third current source 615. A control terminal (e.g., a gate) of the transistor 616 is coupled to the current output terminal of the first current source 611 and the first terminal of the capacitor 612.

The clamping circuit 426 illustrated in FIG. 6 includes a resistor R and a switch Q1. A first terminal of the resistor R is coupled to the output terminal of the ramp generator circuit 421 to receive the ramp voltage VRAMP. A first terminal of the switch Q1 is coupled to a second terminal of the resistor R. A second terminal of the switch Q1 is coupled to the output terminal of the error amplifier 422 to receive the comparison voltage VCOMP. When the PWM device 420 is operated in the PWM mode, the switch Q1 is turned off. When the switch Q1 is turned off, the clamping circuit 426 does not influence the comparison voltage VCOMP and the ramp voltage VRAMP, i.e., the comparison voltage VCOMP is independent from the ramp voltage VRAMP. When the PWM device 420 is operated in the non-PWM mode (e.g., the PFM mode), the switch Q1 is turned on. When the switch Q1 is turned on, the resistor R of the clamping circuit 426 induces the comparison voltage VCOMP to follow the ramp voltage VRAMP. A resistance of the resistor R may be determined according to design requirement. Based on the resistance setting of the resistor R, the voltage gap Vgap2 (i.e., the voltage gap between the ramp voltage VRAMP and the comparison voltage VCOMP) illustrated in FIG. 5 is reduced as much as possible, which is conducive to the instant return to the PWM mode. In other embodiment, the first terminal of the switch Q1 may be coupled to the output terminal of the ramp generator circuit 421, and the first terminal and the second terminal of the resistor R may be respectively coupled to the second terminal of the switch Q1 and the output terminal of the error amplifier 422.

Referring to FIG. 6, in the condition that the switch Q1 is turned on, if the level of the comparison voltage VCOMP is smaller than the level of the ramp voltage VRAMP, VCOMP=VRAMP−I*R, where I=I1−I2, I represents a current flowing through the resistor R, I1 represents a current of the second current source 614, and I2 represents a current of the third current source 615. A size of the current I may be adjusted by adjusting a value of R. FIG. 5 illustrates that the voltage gap Vgap2=VRAMP−VCOMP=I*R, and thus, the voltage gap Vgap2 may be determined by adjusting the value of R. For example (but not limited to), the voltage gap Vgap2 may be set to 10 mv. In comparison with the voltage gap Vgap1 (which is normally about 100 mv) illustrated in FIG. 3, the voltage gap Vgap2 illustrated in FIG. 5 is much smaller than the voltage gap Vgap1 illustrated in FIG. 3. The reduced voltage gap Vgap2 contributes to inducing the PWM device 420 to rapidly separate from the non-PWM mode (e.g., the PFM mode) and return to the PWM mode. On the other hand, when the ramp voltage VRAMP varies with a manufacturing process, the comparison voltage VCOMP is also capable of following the ramp voltage VRAMP. Such relationship characteristic contributes to increasing consistency of mass production products.

It is considered that the level of the comparison voltage VCOMP is greater than the level of the ramp voltage VRAMP in the condition of the switch Q1 being turned on. If the level of the comparison voltage VCOMP is greater than the level of the ramp voltage VRAMP, VCOMP=VRAMP−I*R=VRAMP+I'*R, where I'=−I=I2−I1. A size of a current I' (i.e., a current (−I)) may be adjusted by adjusting the value of R, and the voltage gap Vgap2 illustrated in FIG. 5 is determined by adjusting the value of R.

In case the PWM mode is returned to from the PWM device 420, the switch Q1 is turned off, and thus, the clamping circuit 426 is stopped (disabled), while the connection between VCOMP and VRAMP (i.e., the connection between the output terminal of the error amplifier 422 and the output terminal of the ramp generator circuit 421) is also disconnected.

It should be noted that in previous application scenarios, related functions of the control circuit 130 may be implemented as software, firmware or hardware by using general purpose programming languages (e.g., C or C++), hardware description languages (e.g., Verilog HDL or VHDL) or other suitable programming languages. The software (or firmware) capable of executing the functions may be deployed in any computer-accessible media, such as magnetic tapes, semiconductor memories, magnetic disks or compact disks (e.g., CD-ROM or DVD-ROM) or may be delivered through the Internet, wired communication, wireless communication or other communication media. The software (or firmware) may be stored in the computer-accessible media for a processor of the computer to access/execute the programming codes of the software (or firmware). Moreover, the device and the method of the invention may be implemented by means of a combination of hardware and software.

To summarize, in the DC-to-DC converter and the PWM device thereof provided by the embodiments of the invention, the clamping circuit is configured. The clamping circuit is disabled when the PWM device is operated in the PWM mode, such that the comparison voltage is independent from the ramp voltage. Thus, the clamping circuit does not influence the operation in the PWM mode. The clamping circuit is enabled when the PWM device is operated in the non-PWM mode (e.g., the PFM mode), such that the comparison voltage follows the ramp voltage, and the voltage gap between the ramp voltage and the comparison voltage is reduced as much as possible. Thus, when the load becomes heavy, the operation mode of the DC-to-DC converter can be rapidly and instantly return to the PWM mode from the non-PWM mode (e.g., the PFM mode).

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A pulse width modulation (PWM) device, for receiving a feedback voltage and correspondingly outputting a pulse signal, comprising:
    a ramp generator circuit, configured to generate a ramp voltage;
    an error amplifier, configured to receive the feedback voltage and a first reference voltage, compare a voltage difference between the feedback voltage and the first reference voltage and output a comparison voltage corresponding to the voltage difference;
    a comparator, having a first input terminal coupled to an output terminal of the ramp generator circuit and a second input terminal coupled to an output terminal of the error amplifier, and configured to receive and compare the ramp voltage and the comparison voltage, so as to output the pulse signal; and
    a clamping circuit, having a first terminal coupled to the output terminal of the ramp generator circuit and a second terminal coupled to the output terminal of the error amplifier, and configured to determine whether to induce the comparison voltage to follow the ramp voltage, wherein the clamping circuit comprises:
        a first resistor, having a first terminal coupled to the output terminal of the ramp generator circuit; and
        a first switch, having a first terminal coupled to a second terminal of the first resistor and a second terminal coupled to the output terminal of the error amplifier.

2. The PWM device according to claim 1, wherein the first switch is turned off when the PWM device is operated in a PWM mode, and the first switch is turned on when the PWM device is operated in a non-PWM mode.

3. The PWM device according to claim 1, wherein the ramp generator circuit comprises:
    a first current source;
    a capacitor, having a first terminal coupled to a current output terminal of the first current source and a second terminal coupled to a second reference voltage;
    a second switch, having a first terminal coupled to the first terminal of the capacitor and a second terminal coupled to the second reference voltage, wherein the second switch is controlled by a PWM signal;
    a second current source, having a current output terminal coupled to the output terminal of the ramp generator circuit;
    a third current source; and
    a transistor, having a first terminal, a second terminal and a control terminal, wherein the first terminal of the transistor is coupled to the current output terminal of the second current source, the second terminal of the transistor is coupled to a current input terminal of the third current source, and the control terminal of the transistor is coupled to the current output terminal of the first current source and the first terminal of the capacitor.

4. The PWM device according to claim 1, further comprising:
    a second resistor, having a first terminal coupled to the output terminal of the error amplifier; and
    a capacitor, having a first terminal coupled to a second terminal of the second resistor and a second terminal coupled to a second reference voltage.

5. A DC-to-DC converter, for converting an input voltage into an output voltage, comprising:
    a DC-to-DC converter circuit, configured to convert the input voltage into the output voltage based on control of a PWM signal;
    a PWM device, having an input terminal coupled to the DC-to-DC converter circuit to receive a feedback voltage, and configured to output a pulse signal corresponding to the feedback voltage,
    wherein the PWM device comprises a ramp generator circuit, an error amplifier, a comparator and a clamping circuit,
    the ramp generator circuit is configured to generate a ramp voltage,
    the error amplifier is configured to receive the feedback voltage and a first reference voltage, compare a voltage difference between the feedback voltage and the first reference voltage and output a comparison voltage corresponding to the voltage difference,
    a first input terminal of the comparator is coupled to an output terminal of the ramp generator circuit and a second input terminal of the comparator is coupled to an output terminal of the error amplifier, and the comparator is configured to receive and compare the ramp voltage and the comparison voltage, so as to output the pulse signal, and
    a first terminal of the clamping circuit is coupled to the output terminal of the ramp generator circuit and a second terminal of the clamping circuit is coupled to the output terminal of the error amplifier, and the clamping circuit is configured to determine whether to induce the comparison voltage to follow the ramp voltage; and
    a control circuit, coupled to an output terminal of the comparator to receive the pulse signal, and coupled to the DC-to-DC converter circuit to provide the PWM signal;
    wherein the ramp generator circuit comprises:
        a first current source;
        a first capacitor, having a first terminal coupled to a current output terminal of the first current source and a second terminal coupled to a second reference voltage;
        a first switch, having a first terminal coupled to the first terminal of the first capacitor and a second terminal coupled to the second reference voltage, wherein the first switch is controlled by the PWM signal;
        a second current source, having a current output terminal coupled to the output terminal of the ramp generator circuit;
        a third current source; and
        a transistor, having a first terminal, a second terminal and a control terminal, wherein the first terminal of the transistor is coupled to the current output terminal of the second current source, the second terminal of the transistor is coupled to a current input terminal of the third current source, and the control terminal of the transistor is coupled to the current output terminal of the first current source and the first terminal of the first capacitor.

6. The DC-to-DC converter according to claim 5, wherein the clamping circuit comprises:
   a resistor, having a first terminal coupled to the output terminal of the ramp generator circuit; and
   a second switch, having a first terminal coupled to a second terminal of the resistor and a second terminal coupled to the output terminal of the error amplifier, wherein the second switch is turned off when the PWM device is operated in a PWM mode, and the second switch is turned on when the PWM device is operated in a non-PWM mode.

7. The DC-to-DC converter according to claim 5, wherein the clamping circuit comprises:
   a second switch, having a first terminal coupled to the output terminal of the ramp generator circuit, wherein the second switch is turned off when the PWM device is operated in the PWM mode, and the second switch is turned on when the PWM device is operated in the non-PWM mode; and
   a resistor, having a first terminal coupled to a second terminal of the second switch and a second terminal coupled to the output terminal of the error amplifier.

8. The DC-to-DC converter according to claim 5, wherein the PWM device further comprises:
   a resistor, having a first terminal coupled to the output terminal of the error amplifier; and
   a second capacitor, having a first terminal coupled to a second terminal of the resistor and a second terminal coupled to a third reference voltage.

9. The DC-to-DC converter according to claim 5, wherein the DC-to-DC converter circuit comprises:
   a first power switch, having a first terminal coupled to the input voltage;
   a second power switch, having a first terminal coupled to a second terminal of the first power switch and a second terminal coupled to a third reference voltage;
   an inductor, having a first terminal coupled to the second terminal of the first power switch and the first terminal of the second power switch, wherein a second terminal of the inductor provides the output voltage;
   a second capacitor, having a first terminal coupled to the second terminal of the inductor and a second terminal coupled to the third reference voltage;
   a feedback circuit, having a first terminal coupled to the second terminal of the inductor, wherein a second terminal of the feedback circuit provides the feedback voltage to the PWM device; and
   a driving circuit, coupled to a control terminal of the first power switch and a control terminal of the second power switch, and configured to control the first power switch and the second power switch based on the PWM signal.

* * * * *